Aug. 8, 1961 H. T. DINKELKAMP 2,995,212
MANUALLY OPERATED PUMP
Filed May 8, 1959 3 Sheets-Sheet 3

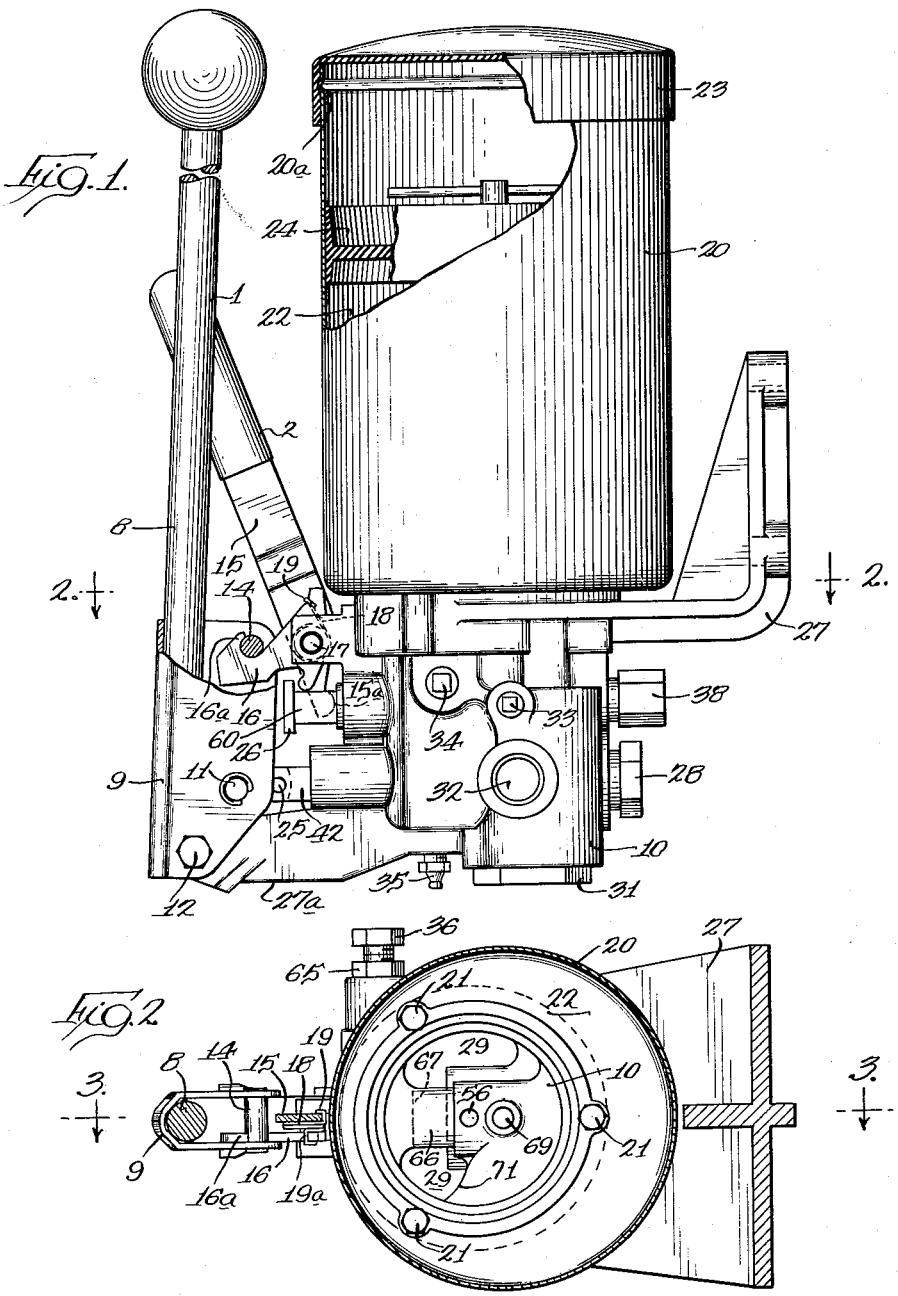

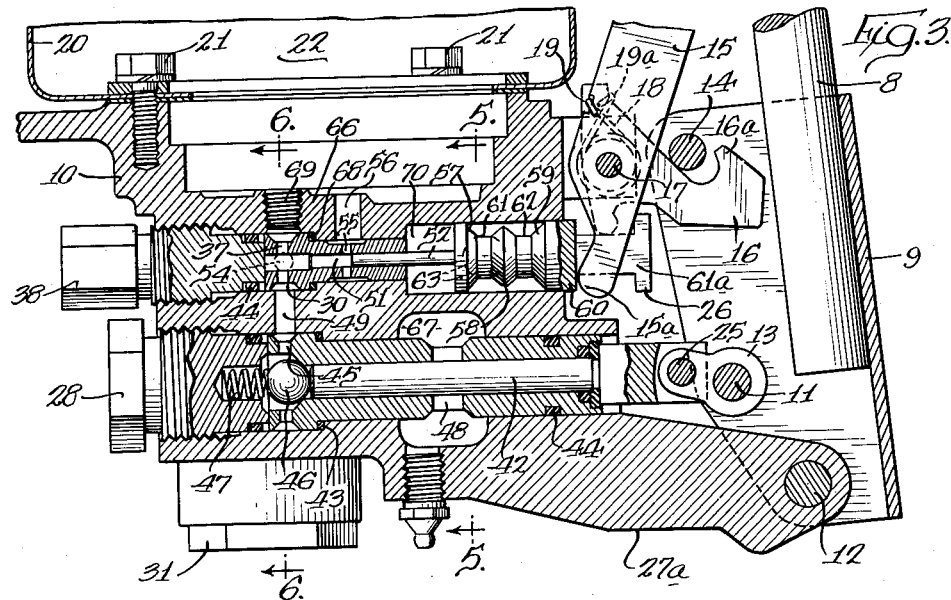
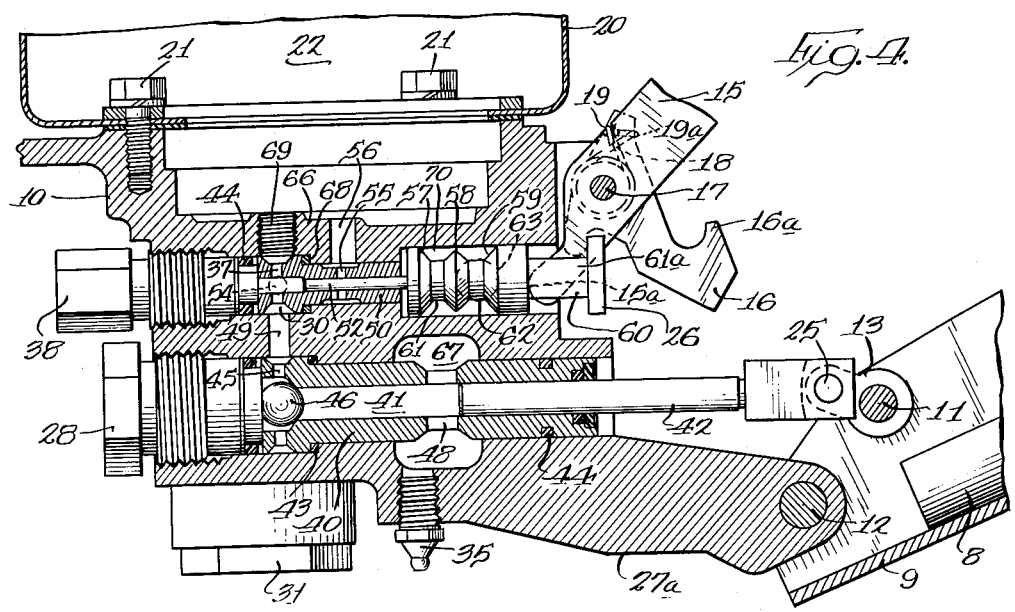
INVENTOR.
Henry T. Dinkelkamp
By John C. Black
Attorney

INVENTOR.
Henry T. Dinkelkamp
By John C. Black
Attorney

United States Patent Office 2,995,212
Patented Aug. 8, 1961

2,995,212
MANUALLY OPERATED PUMP
Henry T. Dinkelkamp, Mount Prospect, Ill., assignor to Stewart-Warner Corporation, Chicago, Ill., a corporation of Virginia
Filed May 8, 1959, Ser. No. 812,012
17 Claims. (Cl. 184—28)

The present invention relates in general to a pressure responsive arrangement for controlling a manually operated pump. More specifically it relates to an arrangement for terminating operation of a manually operated pump and for venting a centralized lubrication system, served thereby, when the lubricant pressure reaches a predetermined value.

In the typical centralized lubrication system, a pump supplies lubricant to a number of remote lubrication points or bearings. Connecting the pump to each bearing is a feed line or pipe, through which the lubricant must be forced. As a rule, the bearings are each designed to accommodate only a specific amount of lubricant. It is, therefore, necessary that a measuring valve be interposed between the feed line and each bearing. This requires that the lubricant also be forced into each valve, and each valve be fully loaded. When a predetermined pressure is achieved at the pump, the feed line is saturated; and the proper operation of each valve is assured. The pressure in the system is then relieved or vented.

One of two typical types of measuring valves are commonly used in systems of this type. One valve delivers a measured quantity of lubricant to its bearing upon the feed line pressure attaining a predetermined high pressure. When the line is vented this valve is refilled and reset. The other valve is filled when the line is pressurized and delivers the lubricant to its bearing when the line is vented. Either type of valve may be served by applicant's improved pump.

Substantial pressure is necessary to ensure complete filling of the feed line and valves. In some cases, pressures approximate 550 p.s.i., or more, at the end of the line. It will be appreciated that the high pressures are a source of considerable strain to pipes, fittings, valves, etc., and that the longer such pressure is maintained, the greater the chance of failure.

Centralized lubrication systems may be either manual or automatic. In manual systems, a pump handle is manually reciprocated to reciprocate a piston. Each piston stroke forces the lubricant into the feed line and from there into each valve. In an automatic system, the reciprocating piston action is generally controlled either electrically or by air pressure. In either case, operation of the automatic system can be terminated by a simple circuit control device or valve arranged to respond to the requisite pressure. The same problem in the case of manual pump operation represents a comparatively complex situation, as the human operator is not easily controlled.

The general practice heretofore for manually operated pumps has been to equip each with an indicator. It is arranged to inform the pump operator that the requisite pressure is reached. The operator is required to terminate operation of the pump and to vent the system. He terminates operation of the pump by releasing the pump handle and vents the system via operation of a vent valve. Venting the pressure in the system permits the respective measuring valves to complete their function.

Because the operator may fail to take cognizance of the indicator or to respond thereto for any of a number of reasons, he may continue to operate the pump after attainment of the desired line pressure or fail to vent the system. This results in either unnecessarily high pressure in the system and/or the maintenance of high pressure for an unnecessarily long period of time. Either result is undesirable.

To avoid these results, the applicant has provided an arrangement for automatically preventing manual operation of the pump, when the requisite pressure has been reached, and for simultaneously venting the system to prevent the maintenance of such pressure. This is accomplished in the preferred embodiment by providing a vent arrangement and a cooperating pump handle latch, which are controlled by a pressure responsive device in the pump housing.

The pump includes a lever which is actuated by the operator to disengage the latch from the handle and close a vent port in the pump housing. Manual operation of the pump handle thereafter forces lubricant into the system. The pressure of the lubricant in the system is transmitted to the pressure responsive device in the housing. When the requisite pressure is reached, the device is operated to control the latch for engaging the pump handle. This prevents further pump operation. Simultaneously, the system is vented to permit the valves to complete their function.

It is, therefore, an object of the present invention to automatically terminate operation of a manually operated pump when a predetermined pressure is attained by operation of the pump.

It is a further object of this invention to simultaneously vent said pressure.

A feature of this invention is the arrangement of a pressure responsive device in the pump housing for controlling a latch to terminate operation of the pump.

Another feature of this invention is the use of the pressure responsive device for controlling venting as well as latching of the pump.

A further feature of this invention is the arrangement permitting said pressure responsive device to respond to the pressure produced by the pump at its outlet.

Another feature resides in the use of a pressure responsive plunger and a spring-biased ball detent operatively engaging the plunger to control the pump latch.

Another feature is the use of an improved pivotal linkage connecting the pump handle and the piston which it operates.

On further reading of the specification and claims, together wth the drawings, other objects and features will become apparent.

Referring now to the drawings:

FIG. 1 shows a side elevation of the pump partially broken away to illustrate the handle latching arrangement and the lubricant reservoir;

FIG. 2 is a sectional view of the pump taken along line 2—2 in FIG. 1;

FIG. 3 is a sectional view taken along line 3—3 in FIG. 2 showing the pump in the latched condition;

FIG. 4 is a sectional view similar to FIG. 3, showing the pump in an operative condition;

Figure 5:
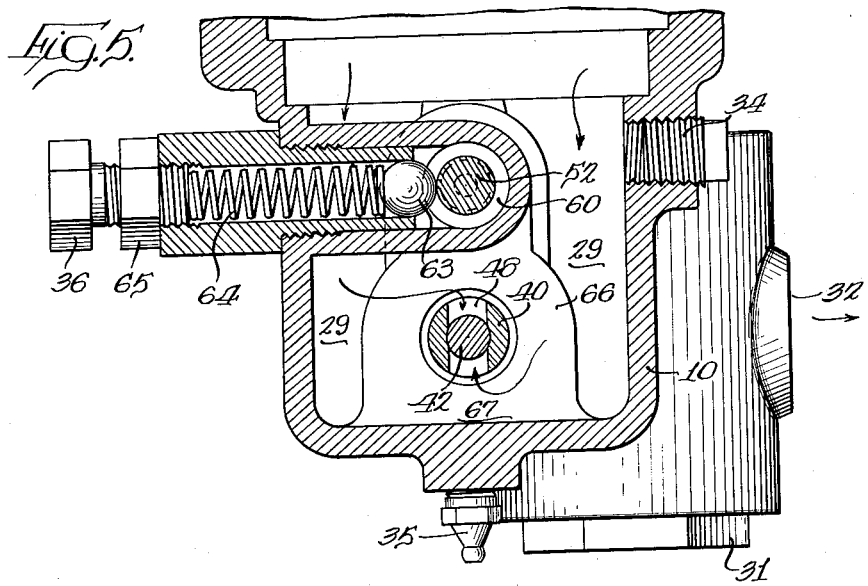
FIG. 5 is a sectional view of the pump taken along line 5—5 in FIG. 3 to show the plunger holding or detent means.

Briefly described, the pump 7 is arranged to be operated when a release lever 15 is rotated in a clockwise direction (FIG. 4) to operate a plunger 60. A bifurcated collar 26, carried by plunger 60 simultaneously rotates a detent portion 16a of a latch element 16 out of engagement with a latch pin 14. Plunger 60 also moves a piston 52 in its bore 51 to cover a vent port 55. Plunger 60 is held in its latching position by a spring loaded ball 63 resting in an annular groove 61 on the plunger. Upon movement of the plunger to its operated position as described above, the ball rolls over the hand 58 to rest in a second groove 62. The biasing force acting on the ball holds the plunger in its operated position.

The lever or pump handle 8, being unlatched, permits the operator to manipulate it for producing the requisite lubricant pressure in the system. The handle 8 reciprocates a piston 42 in its bore or pumping cylinder 41. The lubricant is forced past a ball check valve 46 to a pump outlet port 32, through apertures 49 and 54 and strainer 39. When the lubricant pressure in the system reaches a predetermined value, it overcomes the force of the spring loaded ball 63, holding plunger 60 and piston 52 in place.

The pressure of the lubricant snaps piston 52 and plunger 60 back to their unoperated position. This controls the connected port openings 55 and 56 to vent the lubricant pressure in the system. Simultaneously, collar 26 is disengaged from the latch 16. The latch 16 is returned, under the pressure of spring 18, to its engagement position for latching the pump handle 8. This prevents further operation of the pump.

Referring now to FIG. 1, it will be seen that the pump 7 comprises a casting referred to herein as pump housing 10 and a lubricant reservoir 20. A bracket 27 formed integral with the pump housing 10 enables the pump to be mounted securely to a solid support in any well-known manner. In the chamber 22 of the lubricant reservoir 20 is a lubricant follower plate 24, otherwise known as a cavitation plate. It normally rests on the top surface of the lubricant in the chamber 22. The weight of the follower plate 23 and atmospheric pressure prevent cavitation in the lubricant by collapsing the lubricant into the central cavity, formed therein, during the pumping action. Lubricant reservoir 20 is formed with a bead 20a adapted to mate with a correspondingly shaped depression in a reservoir cap 23 to retain the cap securely in place on top of the reservoir. The cap 23 restricts the intake of dust and other impurities into the lubricant chamber 22 and is removed at various intervals to permit the chamber to be cleaned.

At the left of FIG. 1, is the pump operating lever or handle 8 and the latch release lever 15. The operating lever 8 is inserted in the U-shaped bracket 9 and a portion of the joint brazed to hold the lever 8 securely in place. Bracket 9 is rotatably mounted by means of pin 12 on arm 27a, which is formed integral with the housing 10. This serves as a rugged pivot point for transferring the motion of lever 8 via pin 11 to the lubricant pressure piston 42, as will be explained.

The latch release lever 15 is rotatably mounted on the housing 10 by means of pin 17. Mounted coaxially therewith is latch 16 and the latch return spring 18. Only an end portion 19 of the spring is visible in FIG. 1. Latch 16 has a detent portion 16a formed thereon for grasping pin 14. As pin 14 is carried by bracket 9 in which the operating lever 8 is mounted, this assembly is in effect restrained thereby, and the pump cannot be operated. The lower end 15a of release lever 11 rests between the bifurcated portions 61a of plunger 60. It will be seen that on rotation about pin 17 the end 15a of lever 15 bears against the back of plunger 60 to operate or shift the plunger 60. The collar 26 carried by plunger 60 then engages the latch 16 to release the pump operating lever 8.

At the bottom of FIG. 1 are shown a fitting 35 and strainer retaining cap 31. The fitting 35 is adapted in any well known manner, such as by inclusion of a spring loaded ball check, to permit the introduction and retention of lubricant into the pump. The lubricant is introduced by means of a transfer pump into the bottom of the pump 7 to permit filling of the pump housing 10 and reservoir 20 without the entrapment of air. The strainer cap 31 together with spring 31a (shown in FIG. 6) is provided to retain strainer 39 (also shown in FIG. 6) in the lubricant passage to outlet port 32.

At the outlet port 32 a feed line (not shown) is connected to provide passage for the lubricant from the pump housing 10 to the various lubrication points (not shown). A lubricant return port 34 is provided to enable venting of the lubricant pressure from a reversing valve (not shown) in the event two feed lines are fed alternately by the pump. In such an arrangement outlet port 32 is connected to a reversing valve, which controls which of the two lines are fed. As the venting of the line under pressure is controlled from the valve, a separate vent return is provided to port 34. As this procedure is not necessary to understanding the invention, the return port 34 is shown plugged and will not be further mentioned.

As seen in FIG. 2, the lubricant reservoir 20 is mounted by means of an internally extending flange and screws 21 to the top of pump housing 10. The housing comprises a hollow container having an axial portion 66 into which the pump mechanism is assembled in alignment with levers 8 and 16. The portion 66 approximately bisects the central portion of the housing into cavities 29, which are joined at the bottom of the chamber by aperture 67 in the rib portion 66. Portion 66 is provided with ribs such as 71 for mechanical strength. Vent aperture 56 is provided in portion 66 to connect the lubricant outlet 32 with the reservoir chamber 22. As will be explained, this permits venting the pressure in the system. The cavities 29 comprise a chamber into which the lubricant flows under its own weight and that of follower plate 24 from the reservoir chamber 22. From cavities 29 the lubricant is forced into the system on operation of the pump, as will be explained.

Referring now to FIGS. 3 and 4 it will be seen that axial portion 66 is formed with several apertures into which cylinders 40 and 50 are respectively assembled. The cylinder 40 is firmly seated against the internal flange 43 by retaining plug 28. The retaining plug 28 also holds spring 47 to seat ball 46 against bore 41. This acts as a check valve between the bore 41 of cylinder 40 and port 45 in the cylinder.

Assembled in the respective bores 41 and 51 of cylinders 40 and 50 are pistons 42 and 52 respectively. Each cylinder, as are other portions of the pump, is provided with appropriate gaskets and O rings indicated for example at 44 for well understood purposes. Piston 42 is bifurcated at one end. The connecting link 13 is mounted in this bifurcation by means of pin 25, and serves to transfer axially to piston 41, the force created in the pivoting or rotation of bracket 9 by handle 8. When the piston 42 is retracted, it creates a vacuum in bore 41, then uncovers inlet ports 48 in cylinder 40. This permits the lubricant in cavities 29 to flow from the aperture 67, through port 48 into bore 41. During the pumping stroke of the piston, lubricant in the bore 41 is forced past the check valve ball 46 and through radial ports 45.

Figure 6:
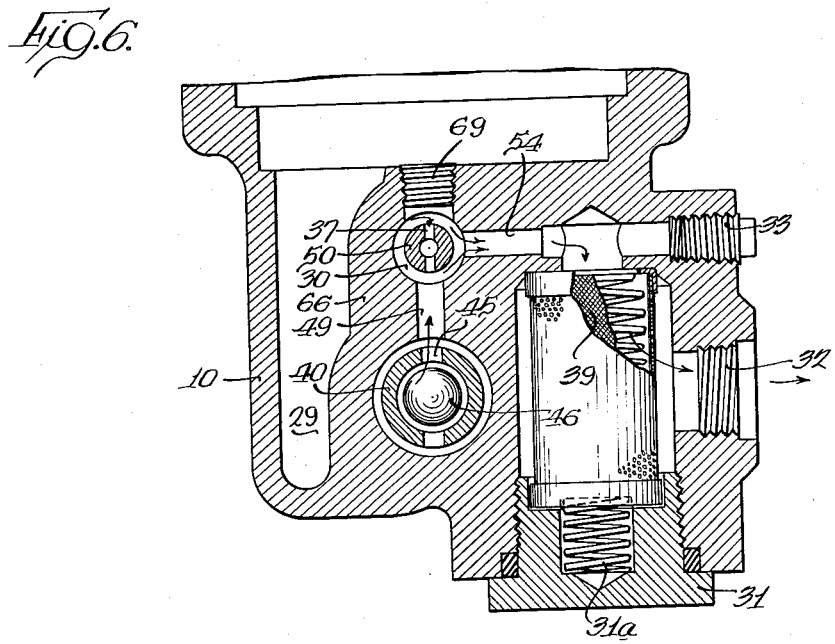
FIG. 6 is a sectional view of the pump taken along line 6—6 in FIG. 3 to show the manner in which the lubricant is passed through the pump housing passages to the pump outlet port.

Repeated operation of lever 8 forces lubricant from the ports 45 to the outlet port 32. That is, ports 45 are connected by way of the aperture 49 in the pump housing portion 66 to an annular port 30 in cylinder 50. As aperture 49 is formed by a core during casting of the housing 10, a plug 69 is provided to seal it from reservoir 20. Cylinder 50 is firmly seated against internal flange 68 by retaining plug 38. Connecting port 30 to the lubricant strainer 39 is the aperture 54 in the portion 66, as is seen in FIG. 6. Aperture 54 is formed by a core during casting of the pump housing necessitating plug 33. From the lubricant strainer 39, it will be seen from FIG. 6 that access is provided through the pump housing 10 to the lubricant outlet port 32 connecting to the feed line. Thus complete passage is provided from bore 41 through the pump housing 10 to the feed line, when the ball check valve 46 is opened by lubricant pressure.

A vertical aperture 55 provided in cylinder 50 is also connected to the outlet port 32 via the aperture or passageway 54, port 30, radial ports 37, and bore 51. It is aligned with the aperture 56 in the pump housing 10, and serves as a vent port. Inserted in bore 51 is piston 52 which serves to cover the vent port, when operated, as shown in FIG. 4.

When piston 52 is assembled in cylinder 50, plunger 60 is aligned thereagainst in the pump housing recess 70. Plunger 60 has formed therein lands 57, 58 and 59 to define two adjacent annular recesses or grooves 61 and 62. The spring loaded ball 63 rests in one groove 61 in a manner shown in FIG. 3, when the pump handle 8 is latched. Referring to FIG. 5 it will be seen that the ball is tensioned by spring 64 to hold plunger 60 in this position. Spring 64 is adjusted by means of tensioning screw 36. Lock nut 65 is provided on tensioning screw 36 to prevent the tension adjustment of spring 64 from varying. This assembly is mounted in the pump housing 10 on a longitudinal axis perpendicular to the longitudinal axis of plunger 60 and in the same plane.

At the end of plunger 60 is the bifurcated collar 26. Resting between the bifurcated portions 61a is the release lever 15. It is rotatably mounted by means of pin 17, which is secured to pump housing 10. Also mounted on pin 17 is the coil spring 18 and latch element 16. One end 19 of coil spring 18 is secured on lever 15 and its other end 19a is secured on latch element 16. Thus spring 18 is tensioned to rotate latch element 16 in a direction tending to bring detent portion 16a in engagement with pin 14 carried by bracket 9. When in engagement, the pump handle 8 is not operable.

To enable operation of the pump, release lever 15 is rotated about pin 17. As the lower end 15a of lever 15 rotates, it bears against plunger 60 to move it further into the pump housing 10. Due to the high mechanical advantage provided by lever 15, the ball 63 rides back on land 58 and comes to rest in the groove 62 between lands 58 and 59. As the piston 52 is moved by plunger 60, it covers the vent port 55 to disconnect it from the lubricant outlet port 32. The collar 26 moves with plunger 60 to rotate latch element 16 about pin 17. This disengages the latch element 16 from the pin 14 carried by bracket 9. Spring 18 tends to return the latch element 16 to its original position, however collar 26, being restrained by plunger 60 and ball check 63, prevents its return.

The operator now operates the pump by rotating the pump handle 8 and attached bracket 9 about the center of pin 12. Bracket 9 in rotation transfers its motion via pin 11 to the link 13. Link 13 is connected to the pin 25 in the bifurcated portion of piston 42. As the first movement of the free end of the pump handle 8 is away from the housing, the link 13 retracts the piston 42. With the piston 42 retracted, lubricant in cavities 29 flows through aperture 67 and port 48 into the bore of cylinder 30. The operator now rotates handle 8 in the other direction. This motion is transmitted to piston 42 in the opposite direction, in a manner explained, to force the lubricant in bore 42 against ball check 46. Due to the high mechanical advantage involved, the ball check is forced back under this pressure to permit the lubricant to enter aperture 49. The operation is repeated, and the lubricant forced through port 30 and from there, through aperture 54 and the strainer 39 to the outlet port 32. It will be noted that as the lubricant is fed out into the feed line it bears against piston 52, and as the lubricant continues to be forced out into the feed line, the pressure increases.

When the lubricant pressure reaches a predetermined value, as determined by the adjustment on spring 64, piston 52 and plunger 60 are forced back despite the ball check 63. The ball check 63 is forced over land 58 into the groove 61 between lands 57 and 58. With piston 52 retracted to the position shown in FIG. 3, the vent port 55 is uncovered. The lubricant pressure therefore is dissipated upward through aperture 56 to the reservoir chamber 22, while ball check 63 prevents further movement of plunger 60. This vents the system.

As plunger 60 moves, collar 26 is disengaged from latch element 16. Latch element 16 then rotates under tension of spring 18 to its latching position. The pump handle 8 may then be in any of a number of positions relative to the latch 16, as the operator is still rotating it. If he is rotating the pump handle clockwise with respect to FIG. 3, pin 14 rides over the top surface of latch element 16. The detent latch 16a grasps the pin 14. This prevents the handle 8 and bracket 9 from being further rotated, and terminates operation of the pump 7.

While there has been described what is believed at present to be the preferred embodiment of the invention, it will be appreciated that various changes and modifications may be made therein, and it is contemplated to cover in the appended claims all such changes and modifications as fall within the true spirit and scope of the invention.

What is claimed is:

1. An improved lubrication pump with vent means comprising means for manually operating said pump to provide lubricant under pressure, latch means normally preventing operation of said pump, a plunger, means for holding said plunger under pressure in any one of a plurality of positions, means for operating said plunger from one position to another position for disengaging said latch means to permit operation of said pump, and means responsive to a predetermined lubricant pressure rendering the vent means effective and operating said plunger from said other position to said one position to cause said latch means to prevent further operation of said pump.

2. An arrangement such as described in claim 1 in which said means for holding said plunger under pressure comprises a ball adapted to mate with any one of a plurality of recesses in said plunger, and a spring for holding said ball in engagement with said recesses.

3. An arrangement such as described in claim 1 in which said means for holding said plunger under pressure comprises a stop under tension and adapted to hold said plunger in one position.

4. A manually operated pump comprising a pump housing with a supply outlet and a vent passageway, a lubricant reservoir for supplying lubricant to said housing, a cylinder having a bore therein for receiving said lubricant, a valve controlling the exit of said lubricant from said cylinder, a piston associated with said bore, a pump handle manually operated for operating said piston to force lubricant past said valve into the supply outlet, a spring loaded device in association with said supply outlet and closing the vent passageway, a latch element controlled by said device to be out of engagement with said handle, and means operated responsive to said device being subjected to a predetermined lubricant pressure for opening said vent passageway and for controlling said latch element to engage said pump handle to prevent its further operation.

5. A manually operated pump with a vent port for use in a centralized lubrication system, the improvement comprising a handle for operating said pump to develop a lubricant pressure in said system dependent on the number of pump operations, a latch normally engaging said handle to prevent operation thereof, control means operated for disengaging said latch from said handle to permit operation thereof and for closing said vent port, means for holding said control means operated under a predetermined pressure, and means for applying the lubricant pressure developed in said system to said control means for overcoming said predetermined pressure to enable said latch to engage said handle and for opening said vent port to vent said system.

6. For use in a centralized lubrication system, a pump with a vent port comprising a piston having access to a lubricant supply, a lever for manually reciprocating said piston to force lubricant from said supply into said system, a latch, means for holding said latch in engagement with said lever to prevent operation of said lever, control means operated for closing the vent port and for disengaging said latch from said lever to permit operation thereof whereby said lubricant is forced into said system, pressure responsive means operated by said control means for holding said latch out of engagement with said lever, and means for applying said lubricant pressure to said pressure responsive means to permit opening of the vent port and to permit operation of said means for holding said latch in engagement with said lever whereby said latch engages said lever to prevent operation of said pump.

7. An arrangement such as claimed in claim 6, in which said control means includes a plunger having a recess therein, and said pressure responsive means comprises a spring loaded stop arranged to mate with said recess for holding said control means operated.

8. A manually operated pump comprising a pair of pistons, a pump housing arranged to receive said pistons in individually corresponding apertures, a first manually operated lever connected to one of said pistons for operating said one piston, means for applying lubricant to the aperture receiving said one piston whereby each operation of said one piston places said lubricant under progressively higher pressure and in association with the other piston, venting means associated with said other piston, a spring loaded device in association with said other piston, a latch element normally controlled by said spring loaded device to prevent operation of said first manually operated lever, another manually operated lever arranged to be operated for moving said spring loaded device, said latch element being controlled by movement of said device for enabling operation of said first manually operated lever and for operating said other piston to prevent venting of lubricant pressure created by operation of said one piston, and means for maintaining said device under spring pressure whereby said device is only operated by said other piston responsive to a predetermined lubricant pressure for controlling said latch element to prevent further operation of said one lever and for venting said system.

9. A manually operated pump comprising a pump housing having a plurality of connected lubricant passages therein, a pair of pistons each adapted to be received in respective lubricant passages in said housing, a valve associated with the passage in which one piston is received to permit entry of lubricant from said passage to a connected passage only under pressure, said connected passage being connected to an outlet port and a vent port through the passage in which the other piston is received, a device in operative association with said other piston, means for holding said device under a predetermined pressure in either of two positions, a rotatably mounted lever individual to each of said pistons, a rotatably mounted latch element for latching the lever associated with said one piston, said device operated from one position to the other position in response to the rotation of the other lever, means carried by said device for disengaging said latch element from said one lever to permit rotation thereof whereby lubricant under pressure is forced past said valve by said one piston to said connected passages, said other piston operated thereby to overcome the pressure holding said device in said other position to open said vent port in response to the pressure in said connected passages exceeding the pressure holding said device in said other position, and means controlled in response thereto for causing said latch element to engage said one lever.

10. In combination a manually operated pump for use in a centralized lubrication system, a handle for operating said pump to develop a lubricant pressure in said system dependent on the number of pump operations, a latch normally engaging said handle to prevent operation thereof, a control plunger having a recess therein, means for manually operating said plunger for disengaging said latch from said handle to permit operation thereof, a stop engaging the plunger recess for holding said plunger operated under a predetermined pressure, and means for applying the lubricant pressure in said system to said plunger to overcome said predetermined pressure for enabling said latch to engage said handle.

11. An improved lubrication pump comprising a pump mechanism for providing lubricant under pressure, a lever for manually operating said mechanism, latch means, a spring normally operating said latch means to engage said lever for preventing operation of said pump mechanism, a plunger having a recess therein, means adapted to mate with said recess for holding said plunger under pressure, means for operating said plunger to mate said means with said recess, means operated by said operated plunger for disengaging said latch means from said lever to permit operation of said pump, and means for controlling said plunger in response to a predetermined lubricant pressure being provided by said pump to disengage said mated means from said recess whereby said latch means is operated by said spring to prevent further operation of said pump.

12. An arrangement such as described in claim 11, in which said mated means comprises a ball, and a spring for holding said ball in engagement with said recess.

13. A manually operated lubricant pump comprising a pump mechanism with vent means for developing progressively higher lubricant pressure on each operation thereof and for subsequently venting the pressure, means for manually operating the pump mechanism to develop progressively higher lubricant pressure, a device operated responsive to a predetermined lubricant pressure developed by operation of the pump mechanism for controlling said means to prevent further operation of the pump mechanism, and means controlled by the pressure responsive device for preventing the venting of the lubricant pressure until the predetermined lubricant pressure is developed and for thereafter permitting venting of the predetermined lubricant pressure.

14. In combination a manually operated pump mechanism having venting means for developing progressively higher lubricant pressures at an associated exit on each operation, a device preventing venting of the lubricant pressure and associated with said exit whereby said device is placed under lubricant pressure on operation of said mechanism, means for holding said device under pressure whereby said device is operated only in response to a predetermined lubricant pressure developed by operation of said pump mechanism, and means thereafter operated by said device to prevent further operation of said pump mechanism, said venting means controlled by said operated device for venting the lubricant pressure.

15. For use in a centralized lubrication system, a pump with a vent port, a manually actuated structure operating the pump to develop a lubricant pressure in the system dependent on the number of pump operations, a latch normally engaging the structure to prevent operation thereof and disengageable therefrom, control means manually moved to a first position disengaging the latch from the structure and closing the vent port and moved by lubricant pressure to a second position enabling the latch to engage the handle and opening the vent port, and biasing means holding the control means in the first position against fluid pressures below a predetermined value.

16. For use in a centralized lubrication system, a pump with a vent port, a manually actuated structure operating the pump to develop a lubricant pressure in the system, a latch normally engaging the structure to prevent operation thereof and manually disengaged therefrom, control means manually moved to a first position closing the vent port and moved by fluid pressure to a second position actuating the latch for engagement with the handle and opening the vent port, and biasing means holding the control means in the first position against fluid pressure below a predetermined value.

17. For use in a centralized system, a manually operated pump, handle means for operating the pump to develop a lubricant pressure in the system dependent on the number of pump operations, a latch normally engaging the handle means to prevent operation thereof and manually disengageable therefrom, biasing means maintaining the latch from engagement with the handle means and lubricant pressure responsive means overcoming the bias means at a predetermined lubricant pressure to enable the latch to engage the handle means.

References Cited in the file of this patent

UNITED STATES PATENTS

| | | |
|---|---|---|
| 970,329 | Heck | Sept. 13, 1910 |
| 1,568,035 | Reynolds | Dec. 29, 1925 |
| 1,809,615 | Wilson | June 9, 1931 |
| 1,881,939 | Purdy | Oct. 11, 1932 |
| 2,616,523 | Davis | Nov. 4, 1952 |